United States Patent
Singh et al.

(10) Patent No.: US 10,359,947 B2
(45) Date of Patent: Jul. 23, 2019

(54) RECLAIMING MEMORY PAGES

(71) Applicant: CA, Inc., New York, NY (US)

(72) Inventors: Ashish Kumar Singh, Lingampally (IN); Sarvani Kuchibhotla, Hyderabad (IN); Vasudev Ippili, Hyderabad (IN); Pradeep Kumar Das, Bhubaneswar (IN)

(73) Assignee: CA, Inc., New York, NY (US)

( * ) Notice: Subject to any disclaimer, the term of this patent is extended or adjusted under 35 U.S.C. 154(b) by 153 days.

(21) Appl. No.: 15/658,540

(22) Filed: Jul. 25, 2017

(65) Prior Publication Data

US 2019/0034095 A1 Jan. 31, 2019

(51) Int. Cl.
G06F 12/02 (2006.01)
G06F 3/06 (2006.01)
G06F 9/455 (2018.01)

(52) U.S. Cl.
CPC .......... *G06F 3/0613* (2013.01); *G06F 3/0631* (2013.01); *G06F 3/0685* (2013.01); *G06F 9/45558* (2013.01); *G06F 12/0253* (2013.01); *G06F 2009/4557* (2013.01); *G06F 2009/45583* (2013.01)

(58) Field of Classification Search
CPC combination set(s) only.
See application file for complete search history.

(56) References Cited

U.S. PATENT DOCUMENTS

| 4,757,438 | A | 7/1988 | Thatte et al. |
| 7,421,533 | B2 * | 9/2008 | Zimmer ................ G06F 12/126 711/170 |
| 9,094,415 | B2 | 7/2015 | Olsen et al. |
| 9,280,458 | B2 | 3/2016 | Durrant |
| 9,479,575 | B2 | 10/2016 | Olsen et al. |

FOREIGN PATENT DOCUMENTS

WO 2003029982 A2 4/2003

\* cited by examiner

*Primary Examiner* — Yong J Choe
(74) *Attorney, Agent, or Firm* — Baker Botts L.L.P.

(57) ABSTRACT

A method includes creating, by one or more computing devices, a first pool of memory resources from a plurality of memory resources in a cluster. The first pool comprises memory resources that (1) have been allocated to a respective guest virtual machine that is not currently being used and (2) that have been marked as unused by the respective guest virtual machine. The method also includes invoking, by the one or more computing devices, a number of operations on the memory resources in the first pool, wherein the number of operations is designed to signal a memory resource manager to reclaim the allocated memory resources that have been marked as unused from the first pool into an unallocated pool of memory resources in the cluster.

20 Claims, 6 Drawing Sheets

RECLAIMING MEMORY PAGES

BACKGROUND

The present disclosure relates to memory pages, and specifically to reclaiming unused memory pages in a virtual computing environment.

BRIEF SUMMARY

According to an aspect of the present disclosure, a method includes creating, by one or more computing devices, a first pool of memory resources from a plurality of memory resources in a cluster. The first pool comprises memory resources that (1) have been allocated to a respective guest virtual machine that is not currently being used and (2) that have been marked as unused by the respective guest virtual machine. The method also includes invoking, by the one or more computing devices, a number of operations on the memory resources in the first pool, wherein the number of operations is designed to signal a memory resource manager to reclaim the allocated memory resources that have been marked as unused from the first pool into an unallocated pool of memory resources in the cluster.

Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements of a non-limiting embodiment of the present disclosure.

DETAILED DESCRIPTION

Figure 1:
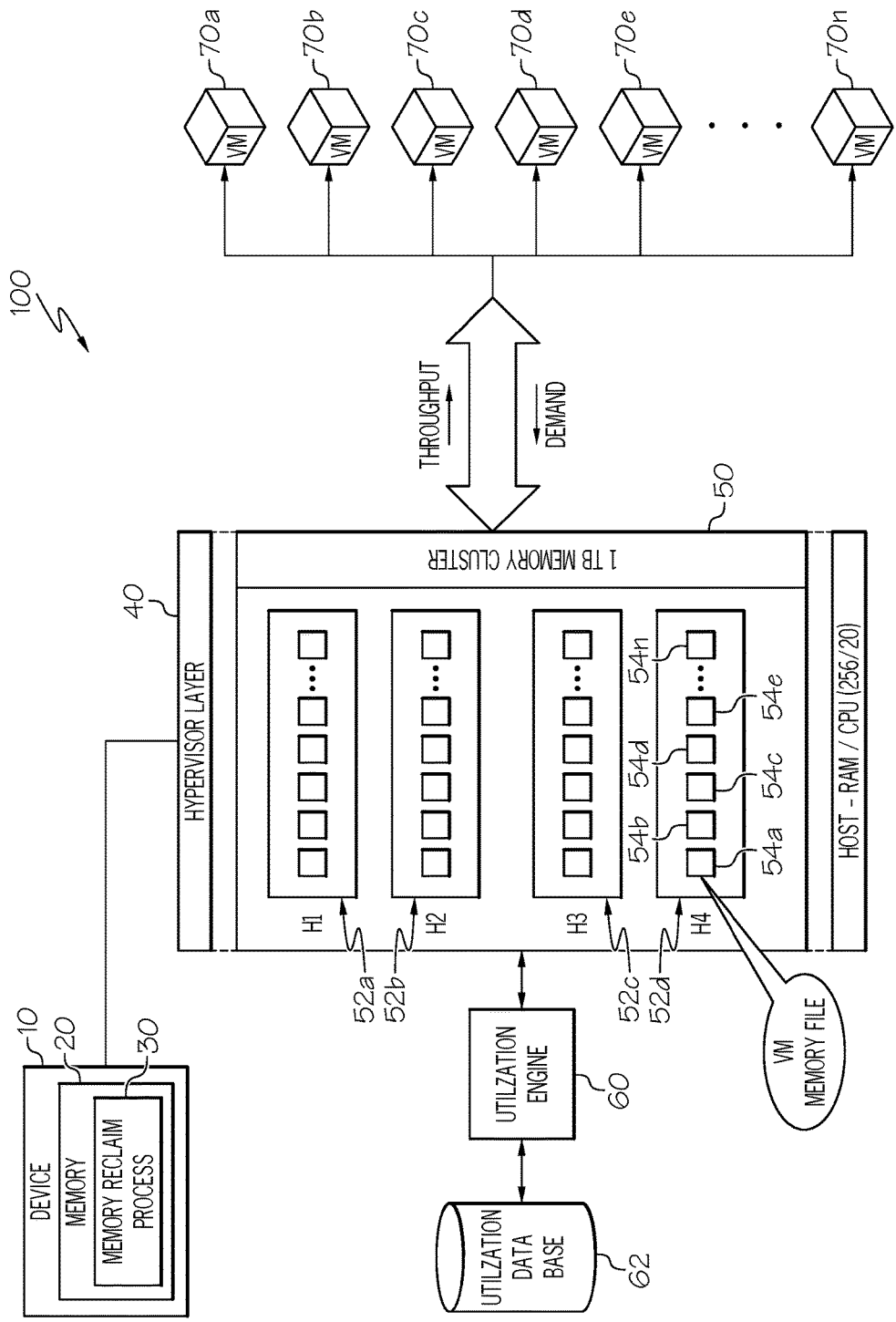
FIG. 1 is a block diagram of a virtual computing environment in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Each activity in the present disclosure may be executed on one, some, or all of one or more processors. In some non-limiting embodiments of the present disclosure, different activities may be executed on different processors.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

Virtualization of computing devices has become extremely popular as a computing architecture model for servicing large scale IT organizations and their customers. Cloud resource deployment and provisioning systems frequently use virtualization technology to scale resources for customer or organization needs. For example, demand for computing resources often fluctuates wildly, whether due to the work schedule of a company's employees (.e.g., mainly 9-5 pm in US or Indian time zones). Virtualization of computing resources enables an organization to tailor deployment of resources to the hours of expected computing demand or workloads.

Often, administrators seek to optimize the deployment of resources so that only those resources that are required to be used, for example by a workforce or customers, are deployed. Such planning may cut out overhead in terms of resource hosting and power costs, and can result in more efficient use of deployed computing resources. Moreover, individual virtual machines (guest machines) may operate more efficiently and increase performance by optimizing resource allocation to those guest machines. For example, memory may be a particular virtual resource that is in high demand. For example, web application sessions may demand a dedicated memory space for each "active" user of the application. With many users, demand for memory can fluctuate widely between peak and non-peak hours. As another example, an organization may deploy a virtual machine for each employee, or may otherwise make applications available in a virtualization environment for use by employees. In this example, the employee may check out a virtual machine at the start of a work day and check in or log out of the virtual machine at the end of the work day. Similarly, applications can be requested and used during business hours.

These virtual machines and/or applications may request memory resources in order to perform tasks. For example, an application can be allocated virtual memory resources from a pool or cluster of shared but unclaimed or unallocated memory resources. The resources allocated to the particular virtual machine may not be used by other resources since they are allocated to the particular virtual machine or application. Thus, that application may have full access to the allocated memory without overwriting a page associated with a different virtual machine or application.

Often, virtualization platforms include a virtualization manager, such as a hypervisor. A hypervisor or virtual machine monitor runs, manages, creates, and takes down virtual machines. The hypervisor manages resources of one or more host machines and may run on the physical computing devices of the one or more hosts (herein referred to as a "host", though those of ordinary skill in the art will appreciate that a host may encompass multiple physical computing devices). The resources of the host are organized to service the demands of guest operating systems that share the computing resources of the host.

However, often the memory resources allocated by the virtual machine monitor exceed the amount of memory that is actually being used by the application or virtual machine. For example, a user may open an application on a virtual machine. The application or virtual machine may request virtual memory resources for use by the application. The virtual machine monitor checks for unallocated memory resources and allocates those resources to the requesting application or machine. The user uses the application, which triggers the allocation of additional memory resources.

When the user finishes working with the application, the user closes the application. This may trigger the virtual machine to mark the allocated memory pages as "free" or "unused"—thus indicating that the virtual machine is free to use those pages for other applications. However, the memory allocated to the application remains allocated to the guest virtual machine that requested that memory. The guest virtual machine is free to use this memory, but other virtual machines may not be able to use this memory. Moreover, the virtual machine monitor may be prevented from allocating this memory to other requesting virtual machines until a high memory resource demand state is detected.

In certain embodiments, a virtualization manager may have built in processes that reclaim allocated but "free" memory resources from guest virtual machines. However, these processes may only be triggered when a memory "crunch" is detected. In other words, the processes that reclaim allocated memory are often triggered when overall resource utilization is highest and memory resources are in high demand. But these processes consume considerable resources in and of themselves. For example, the memory reclamation process may be referred to as a memory ballooning process. The ballooning process of some hypervisors or virtualization managers may examine each page of virtual memory resources to determine allocated and unallocated memory pages. The pages are further examined to identify free or unused pages that are allocated. The free or unused pages are then reclaimed into the unallocated memory pool. This process utilizes at least processing and additional memory resources. Timed along with the high utilization state that triggers the reclamation process, the ballooning process can actual exacerbate the memory crunch state that it is designed to alleviate.

In certain embodiments, virtual system utilization is monitored to determine high and low utilization times. Allocated but unused memory resources are allocated to a virtual resource pool during the low utilization times. Passive or unused virtual machines are used to simulate memory intensive processes on the pool. Memory reclamation processes may be triggered by the simulated memory operations in order to reclaim allocated but unused memory from virtual machines or applications. For example, the unallocated memory in the pool may be relatively low. Thus, the memory reclamation process may interpret simulated memory operations as an actual memory demand scenario where little or no unallocated memory is available to service the additional memory requests. Memory is reclaimed into the unallocated memory space. The operations are halted, and the pool is joined with the remaining memory resources, thereby increasing the unallocated memory resources that are available. Thus, memory may be reclaimed during low utilization periods so that the memory reclamation process is not triggered during high utilization periods. This unallocated memory is then available to service workloads during the high utilization periods.

With reference to FIG. 1, a block diagram of a system for reclaiming memory pages in a virtual computing environment is illustrated in accordance with a non-limiting embodiment of the present disclosure. Virtual memory resources 52a-d including memory files or pages 54a-n are organized within a host memory cluster. Virtual memory resources 52a-d are managed by hypervisor layer 40 and may be allocated to a respective guest virtual machine 70a-n. Virtual memory resources 52a-d may be a virtual representation of underlying physical resources available on one or more physical host machines. For example, the hypervisor layer 40 may manage physical resources of a server or multiple physical machines. As discussed above, virtualization of underlying physical resource enables scaled allocation of appropriate resources for a particular application, machine, or use.

In certain embodiments, utilization engine 60 and utilization database 62 monitor and store historical utilization information for virtual system 100. For example, utilization database 62 stores information including the time and date of each operation executed or requested within virtual system 100. The tracked metrics may include processor, memory, input/output utilization, and the like. The utilization database may additionally store information regarding individual requests or transactions. As a simplified example, virtual system 100 may service employees of an organization that work standard hours, such as 9 AM to 5 PM, Monday through Friday. Utilization Engine may analyze data from utilization database to determine high and low utilization periods. For example, the determination of high or low utilization times may be determined with respect to a demand threshold. In this example, as throughput declines with respect to demand, a threshold level may establish that the system is in a high utilization period. The inverse is also true, with the utilization engine 60 determining a low utilization period where throughput is increasing with respect to demand.

In certain embodiments, device 10 executes a memory reclamation process 30 in memory 20 using one or more processors. The memory reclamation process 30 determines high and low utilization periods with reference to utilization engine 60. Moreover, the memory reclaim process 30 and utilization engine 60 may develop utilization forecasts to predict when high and low utilization periods will occur. Using the above example, the system may determine a low utilization period on weekends, and another low utilization period between 6 PM and 7 AM during weekdays. As another example using a client-facing application, resource demand is at its highest during afternoon and evening hours. For example, users may access a web application hosted by the company the most during evening hours. High utilization periods may vary with respect to times of day, times of year, seasons, holidays, or the like.

Figure 2:
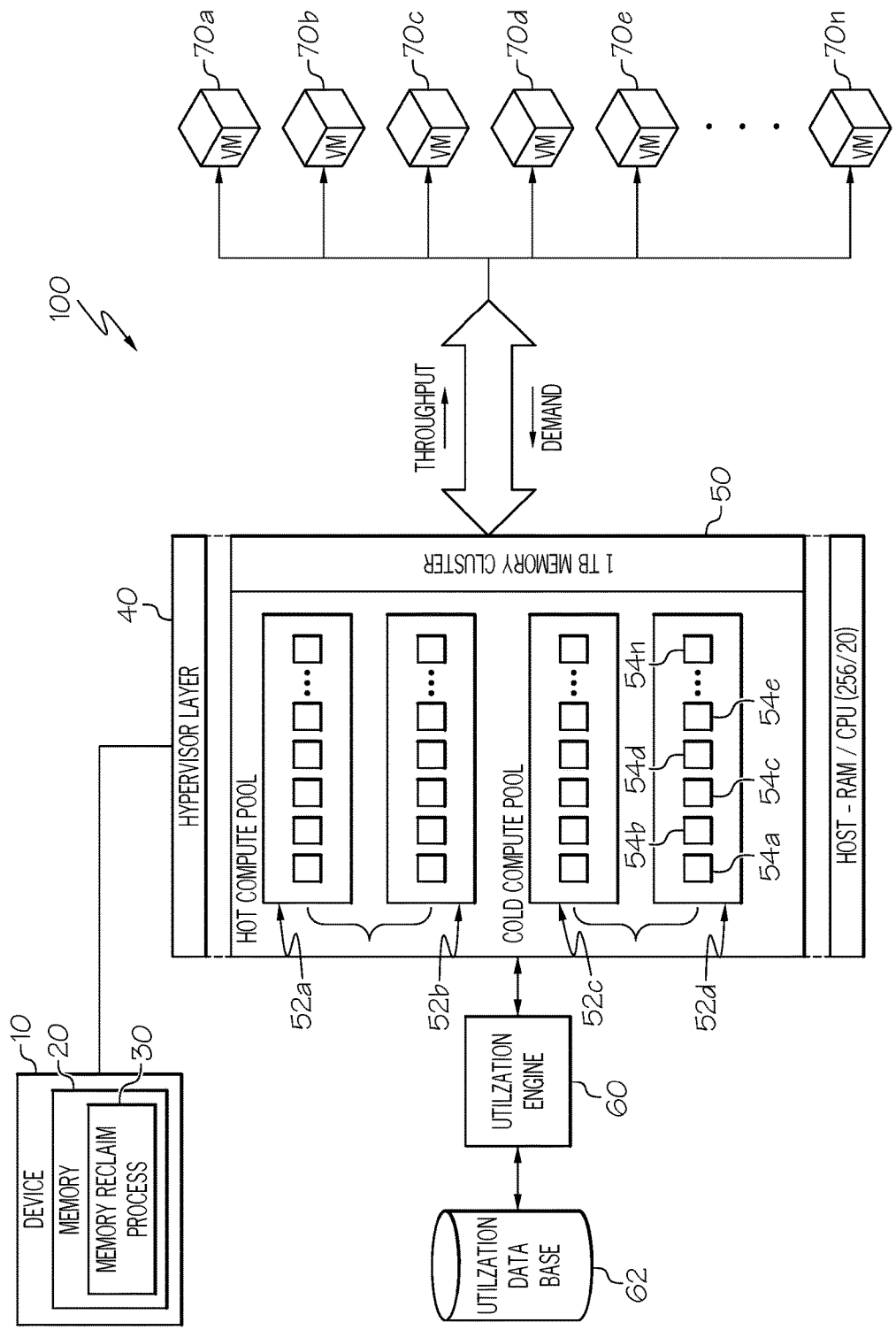
FIG. 2 is a block diagram of a virtual computing environment with memory resources pooled in accordance with a non-limiting embodiment of the present disclosure.

In certain embodiments, memory reclaim process 30 determines that system 100 is in a low utilization period. Memory reclaim process 30 may identify virtual memory resources 52a-d that are allocated to passive virtual machines. For example, hypervisor layer 40 may be used to control the allocation of memory resources between "pools" of resources. For example, with reference to FIG. 2, hypervisor layer 40 may, in communication with memory reclaim process 30, create one or more pools of computing resources. The computing resources may, in this case, be virtual memory resources, such as memory resources 52a-d. Memory reclaim process may specify two pools for allocation of memory resources. A "hot" computing pool may be created to service any active virtual machine instances. A "cold" computing pool may be created and resources may be allocated to it based on whether those resources have been allocated to any passive virtual machines. For example, resources 52a-b may be allocated to a hot computing pol while resources 52c-d may be allocated to a cold computing pool.

In certain embodiments, the resources in the cold computing pool are isolated so that any further operations, such as those invoked or simulated by memory reclaim process 30, do not interfere with active virtual machine performance. Moreover, a smaller number of simulated operations are required in order to invoke any memory reclamation processes. For example, if the full cluster of memory resources is available, the memory reclaim process may instead trigger the allocation of even more memory resources. The simulated activity may then result in even less unallocated memory. However, since the pool is limited to those resources that have been allocated to passive virtual machine instances that have large amounts of allocated but unused memory resources, the virtualization manager will see there are few or no unallocated memory resources in the cold pool and free up memory from allocation within the cold pool.

In certain embodiments, the computing pools may be determined with reference to any active or passive virtual machine instance. For example, a determination as to whether a virtual machine instance is active or passive may be made with reference to hypervisor layer 40. The resources allocated to each passive virtual machine can be identified and pooled so that they are not allocated to any active virtual machine instance. Thus, virtual machine instances that are in use may not be disrupted by memory reclaim process 30.

Figure 3:
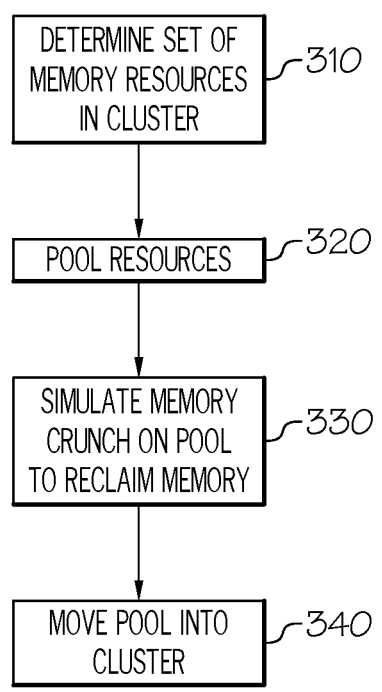
FIG. 3 is a flowchart of a method for reclaiming memory pages in a virtual computing environment presented in accordance with a non-limiting embodiment of the present disclosure.

With reference to FIG. 3, a flowchart of a method for reclaiming memory pages is illustrated in accordance with another non-limiting embodiment of the present disclosure. At step 310, a set of memory resources are determined within a cluster. In certain embodiments, the set of memory clusters may correspond to one or more passive virtual machine instances. The determination as to when to initiate a memory reclaim process is described below. A utilization engine may determine which virtual machines are passive. A virtualization manager may determine corresponding allocated memory resources for those passive virtual machine instances. Further analysis may discover a subset of those memory resources that are allocated but that have also been marked as free. Analysis may also uncover use statistics regarding those memory resources. For example, the utilization engine may contain information that reveals frequency of memory access times between virtual memory resources.

In certain embodiments, resources are allocated to hot and cold resource pools in accordance with step 320. The cold pool may contain memory resources that have been allocated but that have not recently been accessed by its respective virtual machine. The cold pool may also contain resources from virtual machines that have been allocated but that have been marked as "free" by the virtual machine. In certain embodiments, the hot pool may include the resources that are assigned to active virtual machines and any unallocated virtual machine resources. As described above, allocation of unallocated resources to the hot pool is useful because invocation of memory intense operations on cold pool resources may result in allocation of even more memory, and will likely not free up additional memory. As further described above, this may also reduce the number of invoked memory operations that are required to be performed in order to trigger a de-allocation of memory resources. For example, if the virtualization manager determines that no unallocated memory resources remain in the cold pool, the virtualization manager may initiate a ballooning process or may otherwise de-allocate allocated memory resources. However, if the virtualization manager determines that unallocated memory resources do remain in the cold pool, the virtualization manager will first allocate those resources. This increases the number of operations required in order for the manager to initiate the ballooning or reclamation process.

With reference to step 330, the reclaim process simulates a memory crunch on the cold pool resources. For example, the reclaim process may trigger memory intensive operations through a hypervisor or virtualization manager or application programming interface (API). In certain embodiments, the reclaim process initiates a communications link with one or more passive virtual machine instances and invokes memory operations using those passive instances. Since those passive instances are allocated with memory resources from the cold pool, the invoked operations will have the effect of simulating a memory crunch on the memory resources. Sensing this, the virtualization manager will trigger a memory reclaim process on the resources in the cold pool. Thus, allocated memory that is not being used by any active applications in the passive virtual machine instances will be freed up and made available for use.

At step 340, the cold pool resources are moved back into the remaining resources of the cluster and are made available for further use. In other words, the created pools are removed and the resources are made available within the cluster for use by any virtual machine instance. The newly de-allocated memory resources are joined with any unallocated memory resources from the hot pool to increase the total number of unallocated memory resources.

Figure 4A:
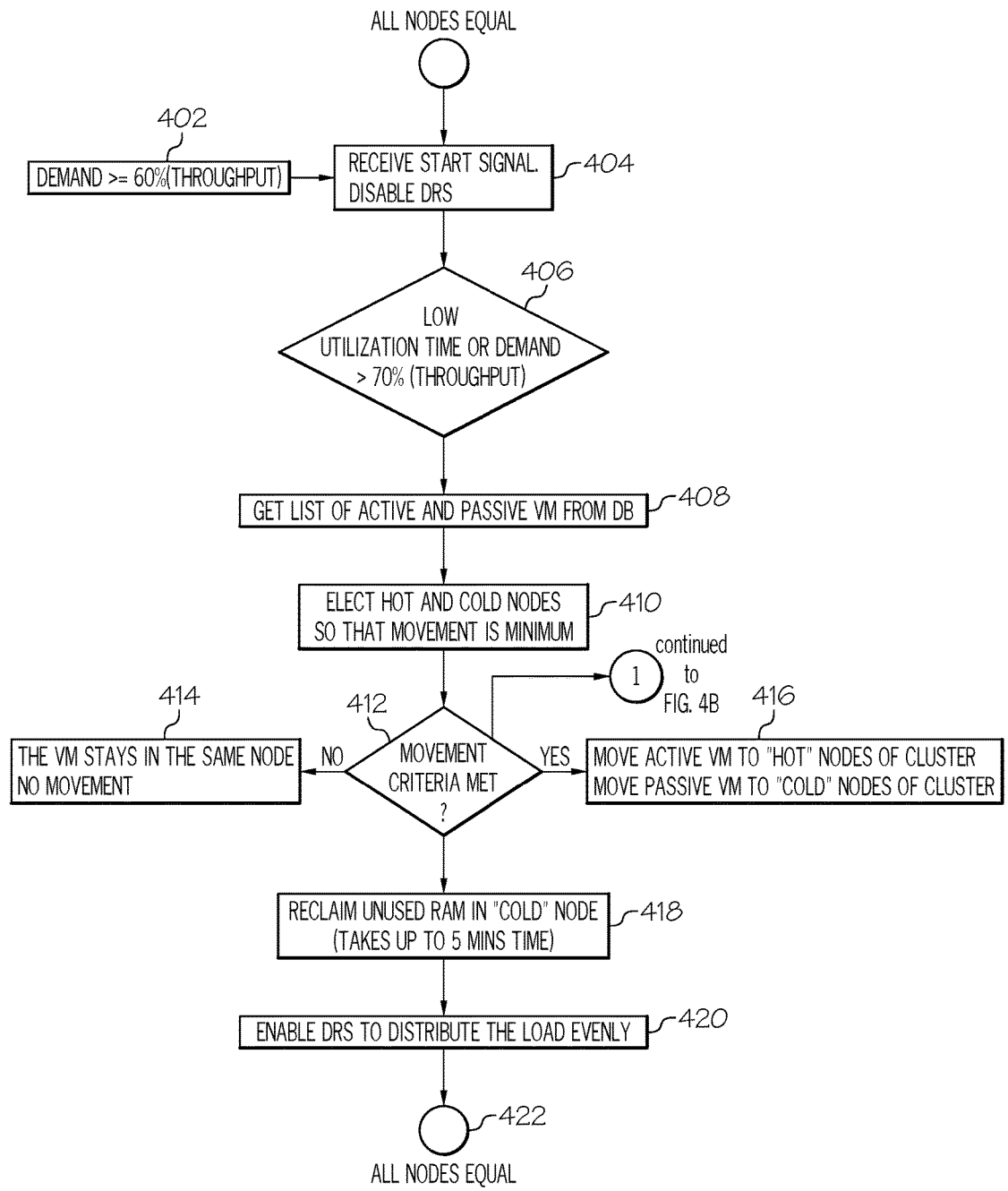
FIGS. 4A and B are flowcharts of a method for reclaiming memory pages in a virtual computing environment presented in accordance with a non-limiting embodiment of the present disclosure.

With reference to FIG. 4A, another flow chart of a method for reclaiming memory pages is illustrated in accordance with yet another non-limiting embodiment of the present disclosure. At step 402, a determination is made regarding utilization of memory resources. For example, the determination may be made by a utilization engine that compares demand to system throughput. For example, the engine may determine when demand is greater than 60% of throughput for the system. In other words, the engine may determine when sufficient memory resources are available to meet demand or expected demand (e.g., lower than 60% of memory resources are allocated). This returns the system to a normal operation mode at step 404. The utilization engine then waits for a condition 406 to trigger the memory reclaim process. In certain embodiments, the condition may be when demand is greater than 70% of throughput. In certain embodiments, any threshold for available memory can be set. The system also waits for a low utilization time period in terms of active and passive virtual machines. For example, the utilization forecasts may be used to determine a passive or active time for use of virtual machines within the system.

Figure 4B:
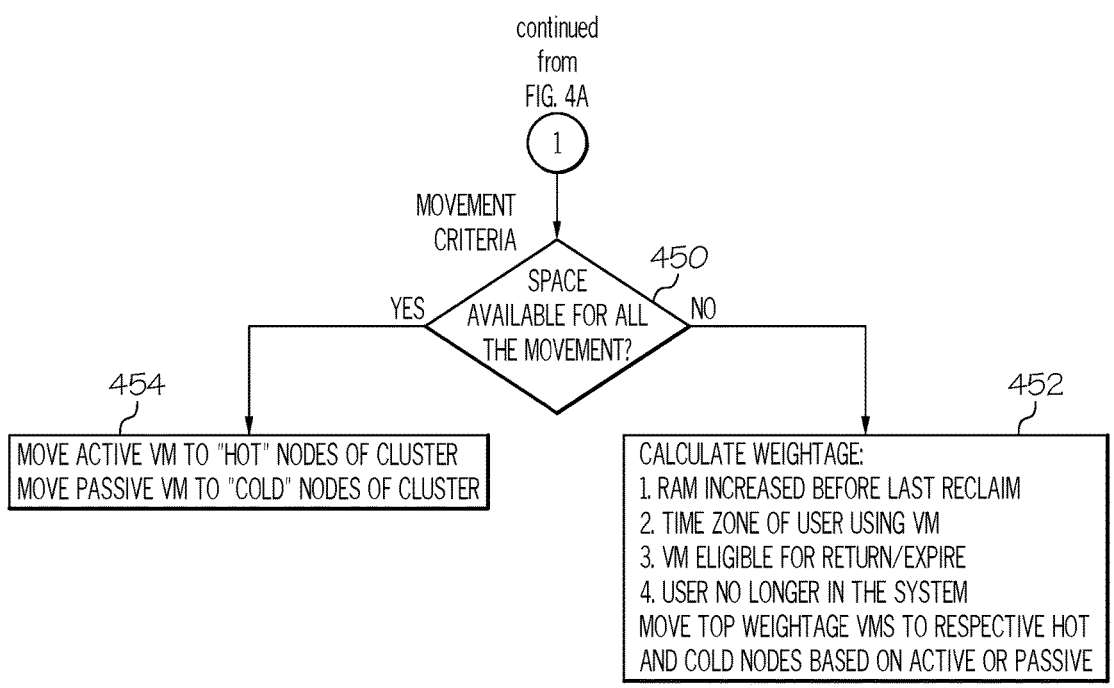

Once the memory availability threshold is reached and the low utilization period is determined, a list of active and passive virtual machines is retrieved from a utilization database at step 408. Hot and cold resources are determined so that movement and use of memory is reduced at step 410. At step 412, the system determines whether the movement criteria is met for each virtual machine. For example, if the virtual machine for a cold resource is passive, then the virtual machine stays assigned to the same resources at step 414. If the virtual machine for a cold resource is active then the virtual machine is moved to memory resources in the hot cluster at step 416. With reference to FIG. 4B, if there is space available for the movement of an active or passive virtual machine between the hot and cold pools of memory resources, then the active virtual machine is moved to the hot resources of the cluster at step 454. In other words, if sufficient memory exists to reassign active and passive virtual machines to hot and cold memory resources respectively, then the reassignment is conducted. Likewise, passive virtual machines are moved to the cold resources of the cluster. For example, memory resources in the cold pool may be prevented from servicing requests while the memory de-allocation or memory reclaiming process is conducted. Thus, active virtual machines, such as those machines with one or more active users, may be reassigned to different memory resources. For example, active virtual machines that have been allocated memory but have marked that memory as free and thus are not actively using that memory may lose access to that memory as it is migrated to the cold pool. This may be referred to as moving active virtual machines to hot nodes in the cluster. Similarly, passive virtual machines can be allocated or made to access cold memory resources of the cluster. In other words, the passive virtual machines are primed to conduct memory operations at the instruction of the memory reclaim process to trigger a memory reclaiming operation by a virtualization manager within the cold pool.

However, if there is no space available for the movement of virtual machines, at step 452 a ranking or weightage is calculated to determine active and passive virtual machines and the highest and lowest ranked virtual machines are moved to hot and cold nodes respectively. For example, the ranking may factor in whether RAM increased before the last reclaim operation, the time zone of the user using the virtual machine along with the relevant usage history information, whether the virtual machine is eligible for return or is about to expire, and whether the user is still actively using the system.

Returning to FIG. 4A, at step 418 allocated but unused memory is reclaimed from cold nodes or cold memory resources and at step 420 a dynamic resource scheduler is instructed to distribute the load evenly. In other words, the memory reclaim process is triggered on the memory resources in the cold pool. For example, the passive virtual machines are instructed to execute simulated or non-user requested operations. In fact, these operations may be designed to trigger the memory reclaim process by requesting large amounts of memory to execute and creating a memory crunch within the cold pool. At step 420, the cold and hot pool boundaries are removed, and the newly freed (unallocated) memory resources are made available to all virtual machines.

Figure 5:
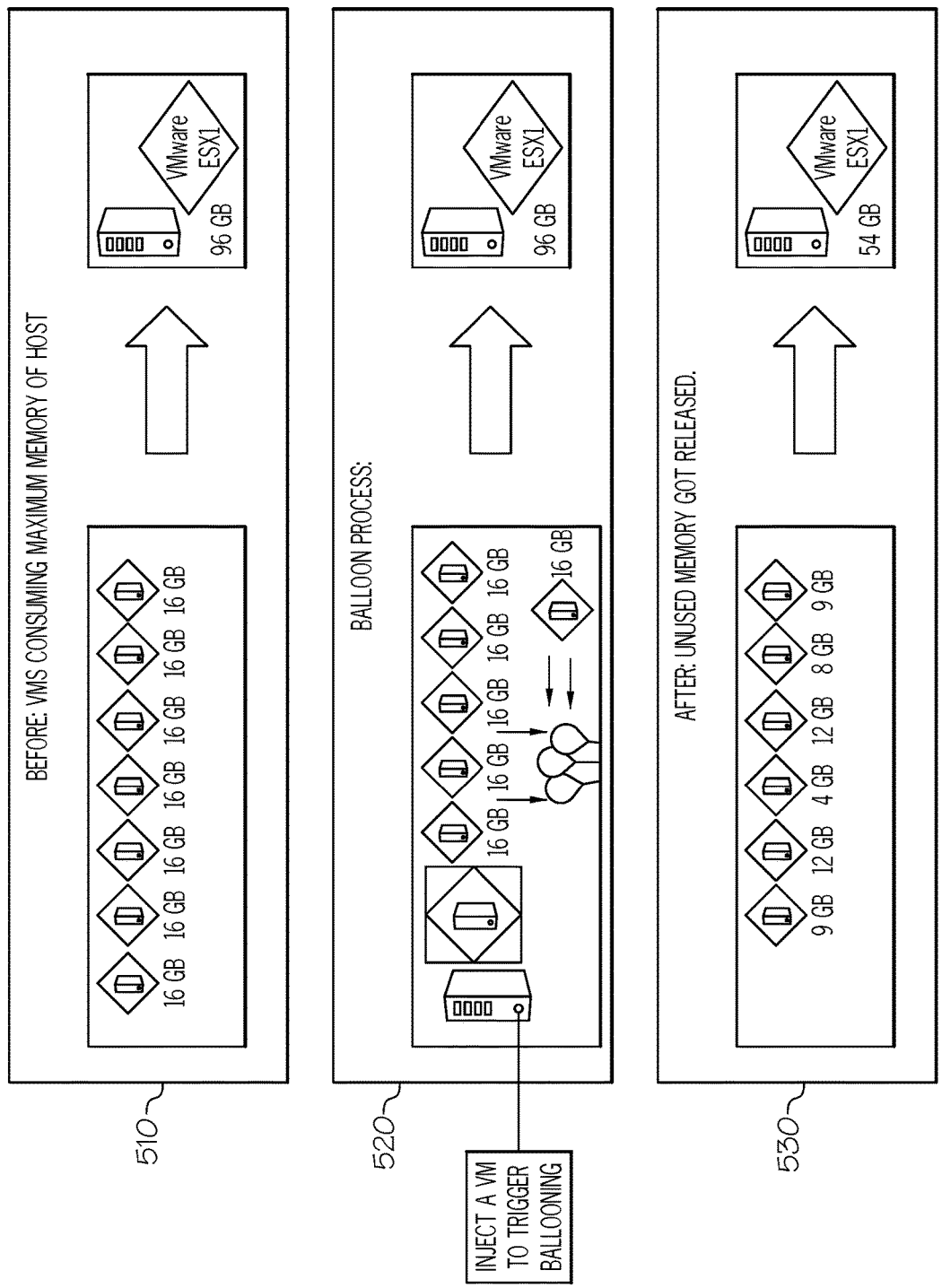
FIG. 5 is a series of diagrams describing the triggering of a memory ballooning process in accordance with a non-limiting embodiment of the present disclosure.

With reference to FIG. 5, several views of a virtualization environment are illustrated in accordance with a non-limiting embodiment of the present disclosure. View 510 illustrates a configuration where several virtual machines are all allowed to freely request and obtain virtual memory resources. For example, this scenario may result in the triggering of a memory reclaim process in the middle of a high load time, such as, for example, in the middle of a work day. This view presents the problem where additional resources are required to free up resources when resources are needed most. In view 510, there are 7 virtual machines illustrated and each are allocated 16 GB of virtual memory resources. The resource cluster has 96 GB of virtual RAM, and is thus running at full capacity. Those of ordinary skill in the art will appreciate the role of a hypervisor layer in allocating memory resources as requested and thus allowing an apparent oversubscription of the virtual memory resources to some extent. For example, view 510 shows 7 virtual machines with 16 GB of virtual memory each which totals 112 GB, which is more than the 96 GB of virtual memory available. View 520 illustrates the memory ballooning process or reclaiming process, where a virtual machine is injected and requests and additional 16 GB of RAM. Such a request or injection may invoke a memory ballooning or reclaiming process, which prunes allocated but unused or "free" memory from virtual machines. Regarding view 530, a series of pruned virtual machines is displayed. For example, where in view 510 each virtual machine was allocated 16 GB of virtual memory, now each virtual machine is only allocated the memory that is using. The remainder is available for allocation to requesting machines. In certain embodiments, virtual machines may also be reclaimed, which may release the full set of allocated memory for that virtual machine. For example, notice that view 530 only contains 6 virtual machines instead of the 7 virtual machines illustrated in view 510.

As referenced above, often, memory pages remain blocked after usage in a virtual memory environment. This leads to memory "crunches" within the cluster as demand increases for resources. These high demand periods, however, are the very events that usually trigger memory reclamation processes in traditional approaches. For example, once a hypervisor determines that unclaimed memory resources are running thin, the hypervisor may initiate a memory ballooning process that reclaims unused but allocated memory within the cluster. In other words, during peak usage times and under the above mentioned memory "crunch" situations, the system triggers additional processes that reclaim unused pages. However, initiating these additional memory reclamation activities when demand is increasing or is high can slow down the entire system. For example, the memory reclamation process may require interaction and sorting of the cluster resources. Moreover, the memory resources have to be inspected to determine if they are allocated, and if so, whether they have been marked unused or free by the guest machine.

High and low demand periods (i.e., peak and valley usage times) can be identified within a virtual computing environment. The memory reclamation process can thus be initiated during those low demand periods in order to avoid the memory crunch situation described above. In certain embodiments, the memory reclamation process is simulated during low demand periods in order to free up resources for high demand periods. In this way, resource utilization can be balanced by simulating memory intensive operations on allocated memory units within the cluster to trigger the virtualization manager's reclamation processes.

In certain embodiments, a large cluster of hosts is created. When utilization reaches a threshold or during off-peak hours, the computing load is divided in terms of active and passive usage. In certain embodiments, these hosts may be divided into respective "hot" and "cold" host pools. A memory "crunch" or high demand period is simulated on passive virtual machines and cold hosts during these low utilization hours or "valley" times in demand in order to trigger a memory reclamation process. Thus, these reclaimed computing resources can be made available for peak system usage hours without triggering the resource intensive reclamation process during those peak usage hours.

Certain embodiments of the proposed solution may be unique in that they may allow the timing and control of the free memory reclaim process without impacting any system performance or user experience.

The flowcharts and diagrams in FIGS. 1-4 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, "each" means "each and every" or "each of a subset of every," unless context clearly indicates otherwise.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
creating, by one or more computing devices, a first pool of memory resources from a plurality of memory resources in a cluster, wherein the first pool comprises memory resources that (1) have been allocated to a respective guest virtual machine that is not currently being used and (2) that have been marked as unused by the respective guest virtual machine; and
invoking, by the one or more computing devices, a number of operations on the memory resources in the first pool, wherein the number of operations is designed to signal a memory resource manager to reclaim the allocated memory resources that have been marked as unused from the first pool into an unallocated pool of memory resources in the cluster.

2. The method of claim 1, further comprising:
merging the memory resource from the first pool with the other memory resources in the cluster.

3. The method of claim 1, wherein the first pool of memory resources is created during an off-peak utilization period.

4. The method of claim 1, wherein the first pool of memory resources is created during a next off-peak utilization period after demand for memory resources becomes greater than a threshold level of memory resource throughput.

5. The method of claim 4, wherein the threshold level of demand for memory resources is 70% of memory resource throughput.

6. The method of claim 1, wherein the cluster is managed by a hypervisor.

7. The method of claim 1, wherein the number of operations are invoked on the memory resources by the respective guest virtual machines that are not currently being used by any users.

8. The method of claim 1, wherein the number of operations simulates a high utilization period for the memory resource manager.

9. The method of claim 1, wherein the number of operations signals a hypervisor to initiate a memory ballooning process to reclaim the allocated memory resources.

10. The method of claim 1, wherein one or more of the memory resources are marked unused in response to the respective guest virtual machine closing an application that was utilizing the one or more memory resources.

11. A computer configured to access a storage device, the computer comprising:
a processor; and
a non-transitory, computer-readable storage medium storing computer-readable instructions that when executed by the processor cause the computer to perform:
creating, by one or more computing devices, a first pool of memory resources from a plurality of memory resources in a cluster, wherein the first pool comprises memory resources that (1) have been allocated to a respective guest virtual machine that is not currently being used and (2) that have been marked as unused by the respective guest virtual machine; and
invoking, by the one or more computing devices, a number of operations on the memory resources in the first pool, wherein the number of operations is designed to signal a memory resource manager to reclaim the allocated memory resources that have been marked as unused from the first pool into an unallocated pool of memory resources in the cluster.

12. The computer of claim 11, wherein the instructions further cause the computer to perform:
merging the memory resource from the first pool with the other memory resources in the cluster.

13. The computer of claim 11, wherein the first pool of memory resources is created during an off-peak utilization period.

14. The computer of claim 11, wherein the first pool of memory resources is created during a next off-peak utilization period after demand for memory resources becomes greater than a threshold level of memory resource throughput.

15. The computer of claim 14, wherein the threshold level of demand for memory resources is 70% of memory resource throughput.

16. The computer of claim 11, wherein the cluster is managed by a hypervisor.

17. The computer of claim 11, wherein the number of operations are invoked on the memory resources by the respective guest virtual machines that are not currently being used by any users.

18. The computer of claim 11, wherein the number of operations simulates a high utilization period for the memory resource manager.

19. The computer of claim 11, wherein the number of operations signals a hypervisor to initiate a memory ballooning process to reclaim the allocated memory resources.

20. A non-transitory computer-readable medium having instructions stored thereon that is executable by a computing system to perform operations comprising:
creating, by one or more computing devices, a first pool of memory resources from a plurality of memory resources in a cluster, wherein the first pool comprises memory resources that (1) have been allocated to a respective guest virtual machine that is not currently being used and (2) that have been marked as unused by the respective guest virtual machine; and
invoking, by the one or more computing devices, a number of operations on the memory resources in the first pool, wherein the number of operations is designed to signal a memory resource manager to reclaim the allocated memory resources that have been marked as unused from the first pool into an unallocated pool of memory resources in the cluster.

* * * * *